(12) United States Patent
Nyu et al.

(10) Patent No.: US 7,373,407 B2
(45) Date of Patent: May 13, 2008

(54) COMMUNICATIONS SYSTEM FOR ESTABLISHING PPP CONNECTIONS BETWEEN IEEE 1394 TERMINALS AND IP NETWORKS

(75) Inventors: Takayuki Nyu, Tokyo (JP); Yuta Ishimoto, Tokyo (JP)

(73) Assignee: NEC Corporation (JP)

( * ) Notice: Subject to any disclaimer, the term of this patent is extended or adjusted under 35 U.S.C. 154(b) by 906 days.

(21) Appl. No.: 10/337,305

(22) Filed: Jan. 7, 2003

(65) Prior Publication Data

US 2003/0131133 A1    Jul. 10, 2003

(30) Foreign Application Priority Data

Jan. 8, 2002    (JP)    ............... 2002-001802

(51) Int. Cl.
     *G06F 15/16*    (2006.01)
(52) U.S. Cl. ...................................... 709/227
(58) Field of Classification Search ................ 709/227, 709/228
See application file for complete search history.

(56) References Cited

U.S. PATENT DOCUMENTS

| | | | | |
|---|---|---|---|---|
| 5,987,524 | A * | 11/1999 | Yoshida et al. | 709/245 |
| 6,185,184 | B1 * | 2/2001 | Mattaway et al. | 370/230 |
| 6,654,382 | B1 * | 11/2003 | Bare et al. | 370/463 |
| 6,757,712 | B1 * | 6/2004 | Bastian et al. | 709/206 |
| 6,801,507 | B1 * | 10/2004 | Humpleman et al. | 370/257 |
| 2001/0030977 | A1 * | 10/2001 | May | 370/475 |
| 2002/0141418 | A1 * | 10/2002 | Ben-Dor et al. | 370/398 |
| 2002/0152311 | A1 * | 10/2002 | Veltman et al. | 709/227 |
| 2003/0198219 | A1 * | 10/2003 | Coggeshall | 370/389 |

OTHER PUBLICATIONS

J. Postel, Multi-LAN Address Resolution, ISI, pp. 1-15 (Oct. 1984).
P. Johansson, The Internet Society, pp. 1-29 (Dec. 1999).
Mamakos et al., The Internet Society, pp. 1-17 (Feb. 1999).
K. Fujisawa, The Internet Society, pp. 1-5 (Jun. 2000).
RCF (Request for Comment) 925, "Multi-LAN Address Resolution" (Oct. 1984).

* cited by examiner

*Primary Examiner*—Jason Cardone
*Assistant Examiner*—Minh-Chau Nguyen
(74) *Attorney, Agent, or Firm*—Dickstein, Shapiro, LLP (57) ABSTRACT

A packet repeater is connected between an IEEE-1394 host terminal and a PPP server. The host terminal transmits a PPP packet containing the physical address of an IEEE-1394 device. During a discovery stage of a PPP connection, the packet repeater receives a PPP packet from the terminal, copies the physical address contained in the packet to an entry of a management table, and successively receives packets from the server and copies the physical address of the server and a session identifier respectively contained in the packets to that entry of the table. During a session stage of the connection, the packet repeater receives a PPP packet either from the terminal or the server and determines the destination of the packet according to the physical address of one of the terminal and the server which is set in the table corresponding to a session identifier of the packet.

20 Claims, 9 Drawing Sheets

FIG. 1

FIG. 2
IEEE 1394 PPPoE PACKET

FIG. 3

DESTINATION MANAGEMENT TABLE 25

| SEARCH KEY | | SEARCHED BY KEY | | | |
|---|---|---|---|---|---|
| | | | NODE INFORMATION | | |
| HOST UNIQUE ID | SESSION ID | NODE ID | GLOBAL UNIQUE ID | UNICAST FIFO ID | SERVER MAC ADDRESS |
| 00004C 002030 | 6A21 | 01 | 00004C02 00002030 | FF FE F0 00 50 00 | 000501 A4A01C |
| ----- | ----- | ----- | ----- | ----- | ----- |
| 25A | 25B | 25C | 25D | 25E | 25F |

COMMUNICATIONS SYSTEM FOR ESTABLISHING PPP CONNECTIONS BETWEEN IEEE 1394 TERMINALS AND IP NETWORKS

BACKGROUND OF THE INVENTION

1. Field of the Invention

The present invention relates to IP communication between terminals connected to networks of different protocols and more specifically to a technique for interconnecting IEEE 1394 networks and IP networks.

2. Description of the Related Art

When an internet protocol packet is relayed between local area networks of different protocols, it is the usual practice to terminate the packet at layer 2 and examine its target address at layer 3, and then forward the packet to an appropriate interface.

The current practice is useful for building large scale networks where the address on one side of a boundary point differs from the address on the other side. However, the use of the current practice for large scale networks is not justified for applications where the number of user terminals is relatively small. Particularly, servers would be installed for communications between terminals.

A method has been standardized by IETF (Internet Engineering Task Force) for networking a number of local area networks of different protocols into a logically single network as RFC 925 (Request for Comment 925 "Multi-LAN Address Resolution"). In this method, a repeater acts as a proxy ARP server for each terminal to process ARP (Address Resolution Protocol) packets. In order for an IP packet repeater to repeat unicast packets between an IEEE 1394 network and an IEEE 802.x network, the repeater is required to perform header translation by rewriting the source address of a packet from a terminal to the physical address of the repeater when the repeater broadcasts an ARP packet to obtain the physical address, or GUID (Global unique ID) of a 1394 terminal and is required to associate the GUID with the physical address, or MAC address of the 802x terminal and their IP addresses.

If a device is attached to the IEEE 1394 bus, a bus reset is triggered and the entire bus is reconfigured automatically. This bus initialization consists of three phases: reset, tree identification and self identification. During the first phase all nodes are informed of a bus reset occurrence. In the succeeding phase the topology of the bus is determined. The last phase is responsible for assigning every device a physical ID. To recognize a device after a bus reset a global unique identifier (GUID) is used for unique addressing.

In response to the ARP request packet, the packet repeater reads the sender IP address field, the GUID field, the sender unicast FIFO field and sets the contents of these fields into the IP address field, the GUID field and the sender unicast FIFO field (available for the receipt of IP datagrams) of an ARP packet management table, respectively. The packet repeater rewrites the ARP packet from the IEEE 1394 format to the IEEE 802.x format by reading the sender and target IP addresses from the 1394 ARP packet into the 802.x ARP packet and setting all zeros in the target MAC address field of the 802.x ARP packet and the repeater's MAC address in the sender MAC address field of the 802.x ARP packet.

The 802.x ARP packet is then encapsulated in an 802.x frame which contains an 802.x header in which the target MAC address field is set to all zeros and the sender MAC address field is set with the repeater MAC address. The frame is then broadcast to all terminals of the 802.x network.

Since the sender MAC address field of the frame is set with the repeater MAC address, all recipient terminals on the 802.x network recognize that the repeater is the sender of the packet. As a result, an ARP reply packet which will be sent from a targeted 802.x terminal is destined to the packet repeater.

The MAC address and the IP address of the targeted 802.x terminal are set in the sender MAC address field and the sender IP address field of this ARP reply packet, respectively. The MAC address of the packet repeater is set in the target MAC address field and the IP address of the 1394 terminal is set in the target IP address field of the ARP reply packet.

When the packet repeater receives this ARP reply packet, it reads a copy of its MAC address of the targeted 802.x terminal from the sender MAC address and sets the copy into the MAC address field of the ARP management table, and reads a copy of the IP address of the targeted 802.x terminal from the sender IP address field and sets the copy into the IP address field.

The ARP reply packet is then encapsulated in an IEEE 1394 packet containing an Asynchronous Block Write (ABW) header in which the unicast FIFO of the requesting 1394 terminal is set in its offset address field, and transmitted from the packet repeater to the 1394 network.

When the requesting 1394 terminal transmits a packet to the target 802.x terminal after the ARP procedure, the 1394 terminal formulates a packet by setting the IP address of the 802.x terminal in the destination address field and specifying the GUID and unicast FIFO of the packet repeater and forwards the packet. On receiving the packet, the packet repeater recognizes that it is targeted and retransmits this packet to the target 802.x terminal. When a packet is transmitted from the 802.x terminal to the 1394 terminal, the 802.x terminal sets the IP address of the 1394 terminal in the destination address field of the packet and specifies the MAC address of the repeater.

During a session, the packet repeater reads the IP address set in a packet received on one side of the repeater as a key to search the ARP packet management table for a corresponding set of MAC address, GUID and unicast FIFO of the destination terminal and rewrites the destination address of the received packet for transmission to the other side of the repeater.

On the other hand, PPPoE (Point to Point Protocol (PPP) over Ethernet (802.3) protocol has been developed to establish a PPP connection over Ethernet. This protocol is divided into two stages according to different modes of communication. In the first stage, called discovery stage, a connection is established between a non-1394 host terminal and a PPPoE server (or node) which can be used as an access concentrator. The host terminal specifies a MAC address of the server to acquire a session identifier. In the subsequent stage, or session stage, in which a session is established to an internet service provider to perform an IP communication using the assigned session identifier. When the session is terminated, the discovery stage is resumed. Discovery and session stages can be distinguished from each other by a value set in the Ethernet-type field of the IP 1394 packet and a value set in the Ethernet-type field of the 802.x packet. If an IEEE 802.x terminal initiates a communication, it sends a PADI (PPPoE Active Discovery Initiation) packet which specifies a service name that the host requests. Since the non-1394 host terminal has no knowledge of the MAC address of the PPPoE server during the discovery stage, it broadcasts a PADI packet to the network. In response, a PPPoE server replies with a PADO (PPPoE Active Discovery Offer) packet to the host terminal, which contains the name of the server and a service name supported. The host terminal responds to this PADO packet by returning a PADR (PPPoE Active Discovery Request) packet which contains the service name and the PPPoE server's name which were previously set in the PADO packet. When the PPPoE server receives this packet, it transmits a PADS (PPPoE Active Discovery Session Confirmation) packet in which a session identifier is set corresponding to the requested service name. When the host terminal receives this PADS packet, a session stage begins. During the session stage, an IP connection specified by the session identifier is performed between the host terminal and the Internet. The session stage is terminated when the host terminal or the access controller transmits a PADT (PPPoE Active Discovery Terminate) packet.

However, the 1394 network cannot accommodate the point-to-point protocol. Therefore, if a 1394 network were connected to an 802.x network, host terminals could not transmit PPP packets. If a PPP connection were established in a system where a 1394 network and an 802.x network are interconnected by a packet repeater, both of the packet repeater and the 1394 terminal cannot acquire destination address at the start of a PPP connection. More specifically, since unicast sessions between 1394 terminals cannot proceed only with a Global Unique Identifier, a unicast FIFO Identifier (i.e., a register address of a device attached to a 1394 serial bus) is additionally required to specify the destination 1394 node that is attached to the 1394 serial bus of the host terminal. However, the host terminal must broadcast an ARP packet to obtain the register address of the destination node by indicating its IP address. Since the host terminal is not assigned an IP address prior to the establishment of a PPP connection and since the ARP procedure requires an IP address, the host terminal cannot rely on the ARP procedure to acquire the address of a destination, and hence it cannot identify the correspondent terminal. Therefore, PPP connections cannot be established between 1394 host terminals.

SUMMARY OF THE INVENTION

It is therefore a primary object of the present invention to enable a packet repeater to recognize the physical address of an IEEE 1394 host terminal during the time prior to the establishment of a PPP connection, whereupon an IP address is assigned to the 1394 host terminal.

The stated object of the present invention is attained by the provision of an IEEE-1394 host terminal for transmitting a PPP packet of a new data format that indicates a physical address of a device attached to the IEEE-1394 serial bus of the host terminal. Specifically, the physical address includes a global unique identifier and a register address (or, unicast FIFO address).

According to a first aspect of the present invention, there is provided a packet repeater adapted for connection between an IEEE 1394 terminal and a PPP (point-to-point protocol) server. The packet repeater comprises a destination management table having an entry corresponding to the terminal, and a controller. During a discovery stage of a PPP connection, the controller receives a PPP packet from the terminal, copies a physical address of a device of the terminal contained in the packet to the entry of the destination management table, and successively receives PPP packets from the server and copies a physical address of the server and a session identifier respectively contained in the packets to the entry of the table. During a session stage of the PPP connection, the controller receives a PPP packet either from the terminal or the server and determines the destination of the packet according to the physical address of one of the terminal and the server which is set in the destination management table corresponding to a session identifier of the packet.

According to a second aspect of the present invention, there is provided a packet repeater adapted for connection between an IEEE 1394 terminal and a PPP server. The packet repeater comprises a node table having an entry corresponding to the terminal, a destination management table having an entry corresponding to the terminal and a controller. The controller detects an IP address assigned to the terminal in a DHCP (dynamic host configuration protocol) process, sends an ARP (address resolution protocol) request packet destined to the IP address, receives an ARP reply packet from the terminal containing logical and physical addresses of a device of the terminal, and copies the logical and physical addresses of the ARP reply packet to the entry of the node table. During a discovery stage of a PPP connection, the controller receives a PPP packet from the terminal, copies the logical and physical addresses of the node table corresponding to a logical address of the packet to the entry of the destination management table, successively receives PPP packets from the server, copies a physical address of the server and a session identifier respectively contained in the packets to the entry of the destination management table. During a session stage of the PPP connection, the controller receives a PPP packet either from the terminal or the server and determines the destination of the packet according to the physical address of one of the terminal and the server which is set in the destination management table corresponding to a session identifier of the packet.

BRIEF DESCRIPTION OF THE DRAWINGS

The present invention will be described in detail further with reference to the following drawings, in which.

DETAILED DESCRIPTION

Figure 1:
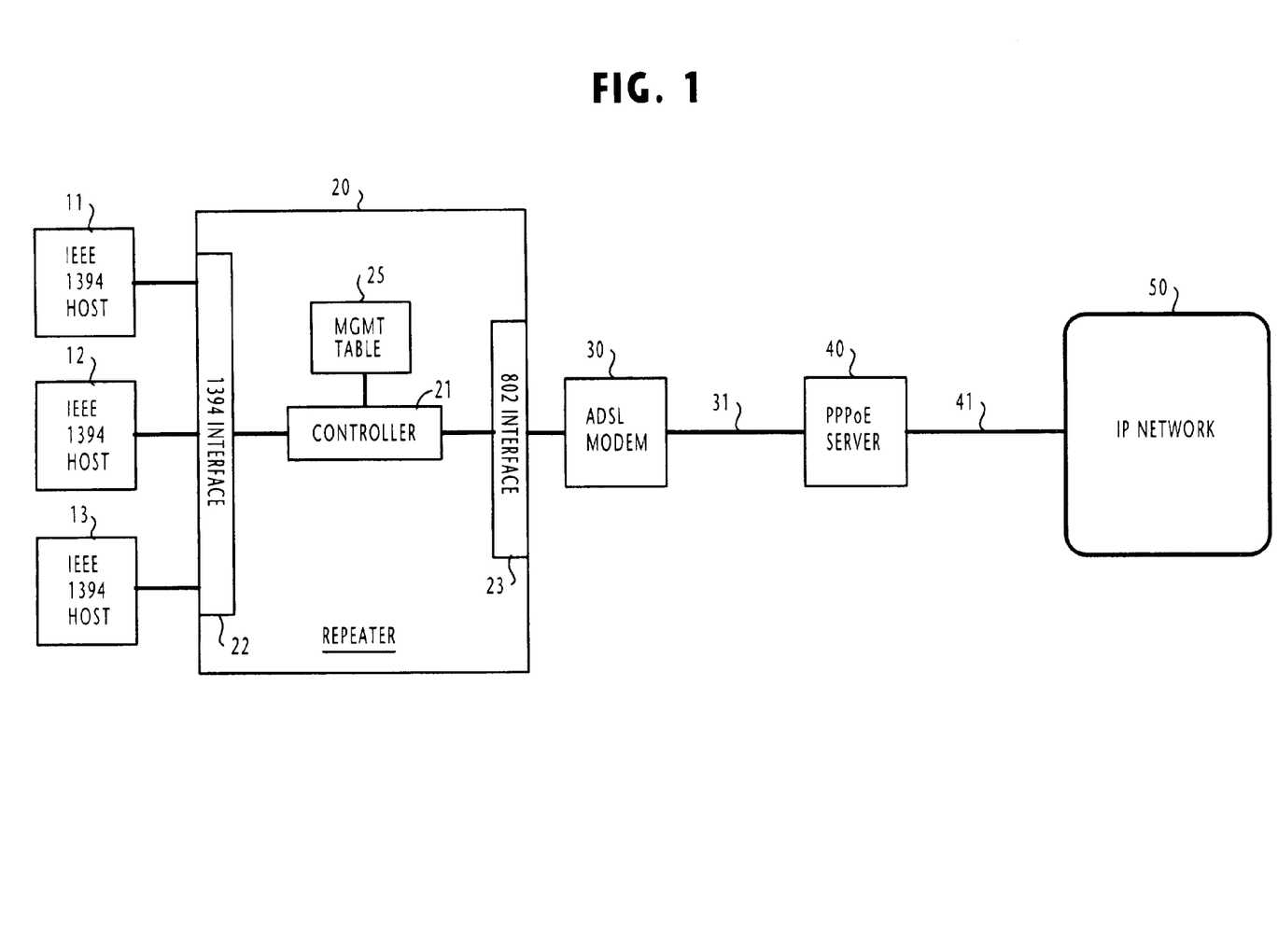
FIG. 1 is a block diagram of a communications system according to a first embodiment of the present invention.

Referring now to FIG. 1, there is shown a communications system according to a first embodiment of the present invention. The system comprises a plurality of IEEE 1394 terminals 11, 12, 13 logically connected to a packet repeater 20 through dial-up connections, for example.

Packet repeater 20 includes a controller 21 connected on one side to the 1394 terminals 11, 12, 13 via an IEFE-1394 interface 22 and connected on the other side to an ADSL modem 30 via an IEEE-802.x interface 23.

The ADSL modem 30 is connected via a communication link 31 to a PPPoE server 40 of a network provider, which is in turn connected to the Internet or IP network 50 via a communication link 41.

A protocol known as IP 1394 (or IPv4 over IEEE 1394, RFC 2734) is installed in each of the 1394 terminals for transmitting an IP datagram encapsulated in an IP1394 packet. For repeating the IP 1394 packet to an IEEE 802.x network, the packet repeater 20 extracts an IP datagram contained in the packet and appends an IEEE-802.x header to the packet and forwards it to the ADSL modem 30.

Figure 2:
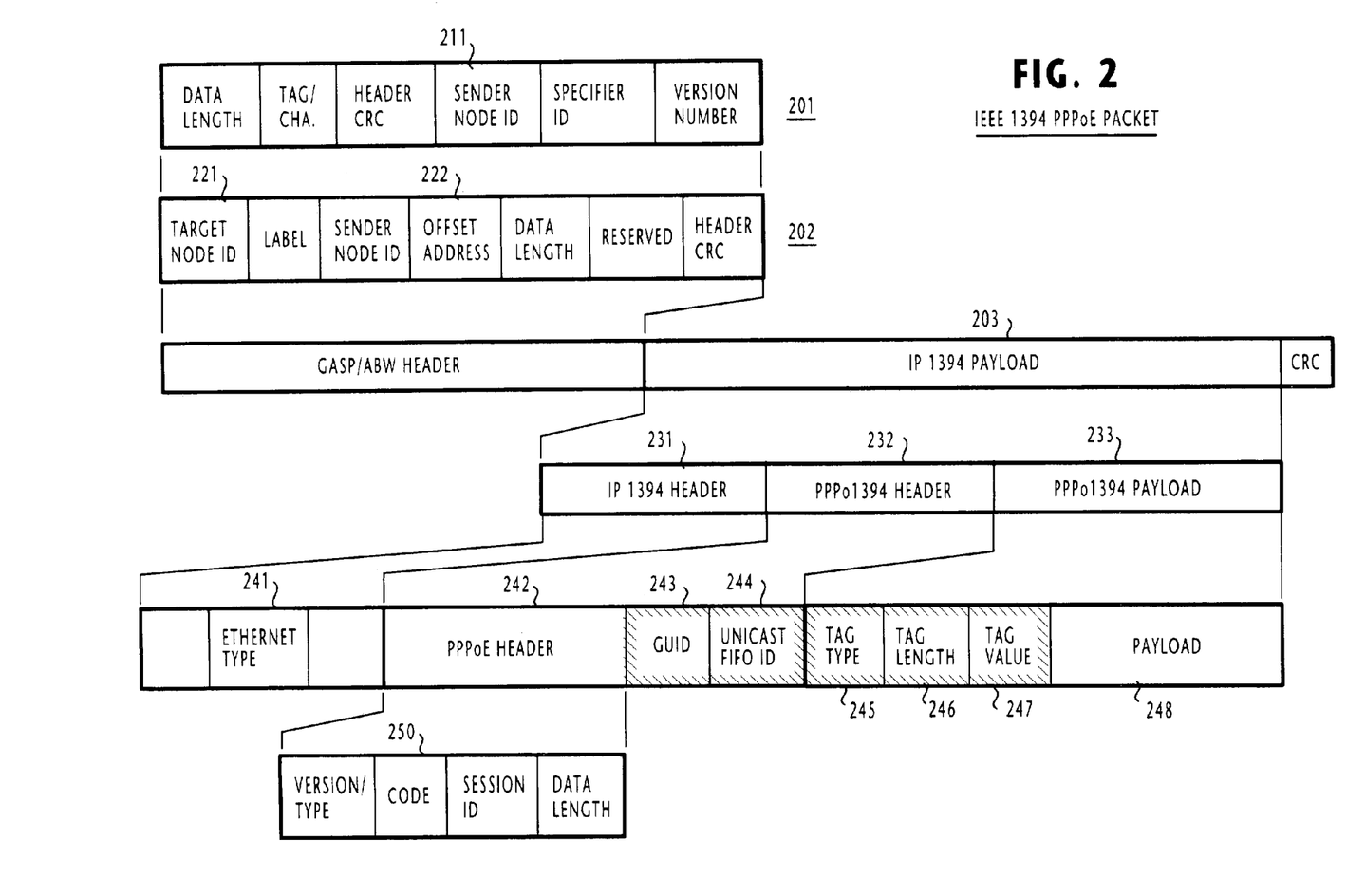
FIG. 2 is an illustration of the data format of an IEEE 1394 PPPoE packet which is transported between IEEE 1394 host terminals and a packet repeater according to the present invention.
Figure 4:
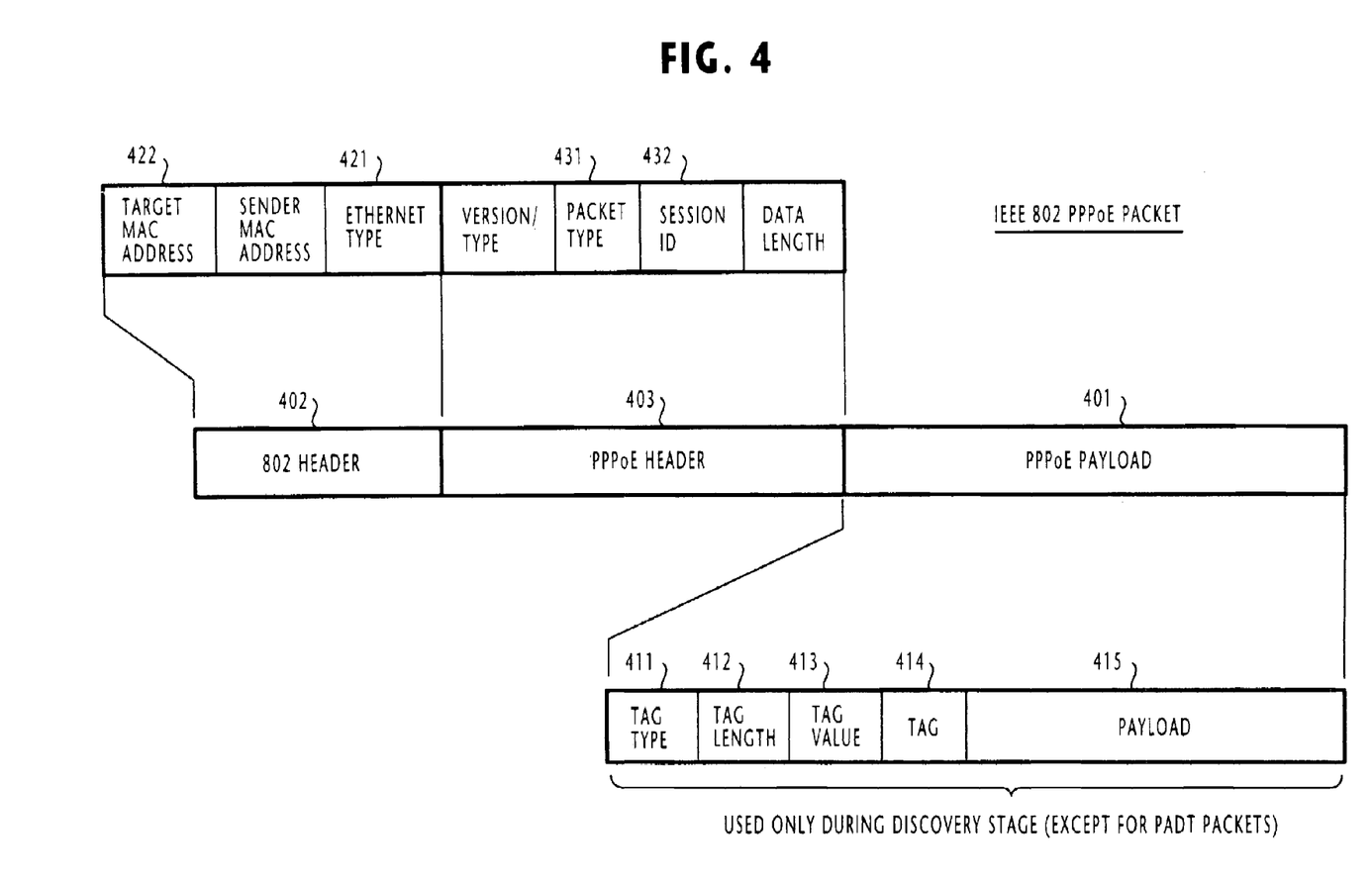
FIG. 4 is an illustration of the data format of an IEEE 802 PPPoE packet which is transported between the packet repeater and a PPPoE server.

An IEEE-802.x packet transmitted from the ADSL modem 30 is received by the packet repeater 20 where the IP datagram is extracted and translated in format to an 1394 packet by appending an IEEE-1394 header comprising a GASP header 201 (when the transmission mode is broadcast or multicast)/Asynchronous Block Write (ABW) header 202 (when the transmission mode is unicast) and an IP 1394 payload 203 and forwarded to the 1394 network as shown in FIG. 2. FIG. 4 illustrates the data format of an IEEE-802.x frame in which a PPPoE header and a datagram are encapsulated in an IEEE 802.x frame.

The 802.x frame includes a packet type (or code) field 431 for setting a value that indicates one of six packet types, including PADI, PADO, PADR, PADS, and PADT. A session ID field 432 is used for setting an assigned session identifier to be used when a session is established. The value set in this field is only effective for packets such as PADS packets and those used during the session stage and PADT packets. A value of zero is set in this field for other packets.

When the packet repeater 20 receives this PPPo1394 packet from a 1394 terminal, it reads the host unique ID from the tag value field 247 of the packet, and the global unique identifier of the 1394 terminal and the unicast FIFO of the terminal. The host unique ID is a unique value derived from the physical address of an IEEE 1394 host terminal. Tag type field 245 indicates that the data stored in the tag value field 247 is the host unique ID. The length of the host unique ID is set in the tag length field 246.

Figure 3:
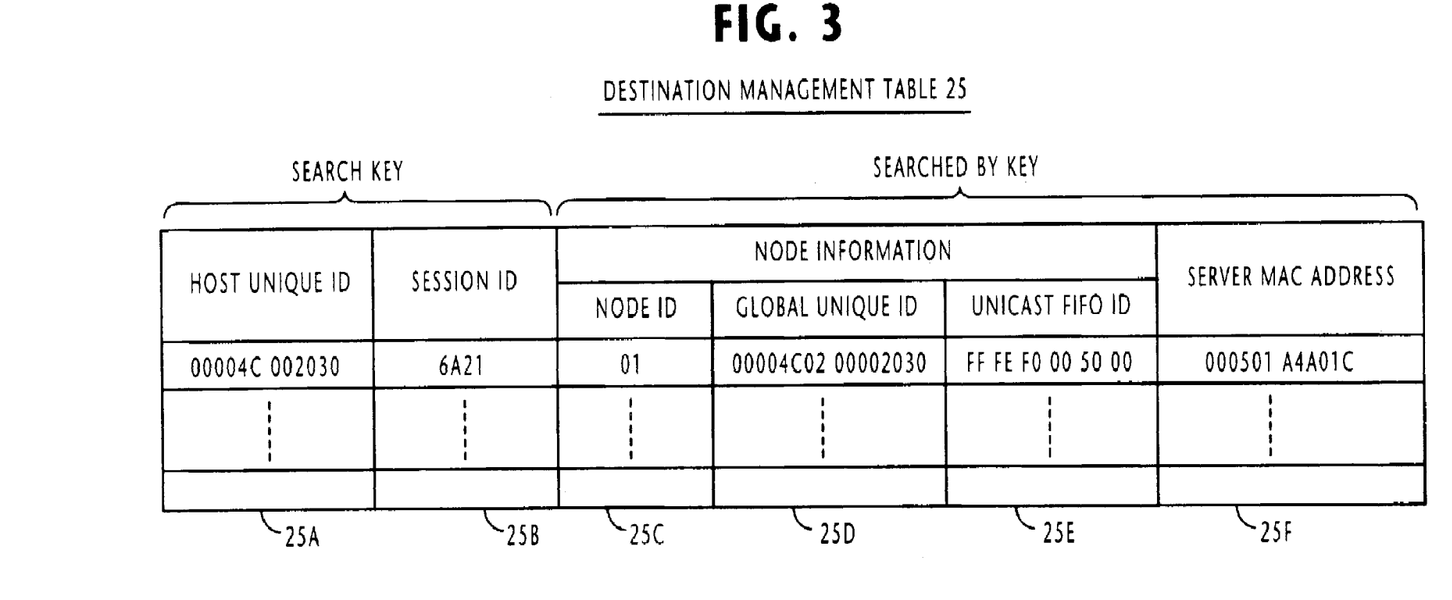
FIG. 3 is an illustration of details of a destination management table.

During the discovery stage, the packet repeater 20 uses the host unique ID as a search key to obtain the node information of the IEEE 1394 host terminal. As illustrated in FIG. 3, the destination management table 25 includes a HUID field 25A in which the host unique identifier is stored for mapping to the node information of the host terminal and the MAC address of the PPPoE server 40. The node information of the host terminal includes the node ID, GUID and unicast FIFO ID of a device attached to the 1394 serial bus of the host terminal, which are respectively set in a node ID field 25C, a GUID field 25D and a unicast FIFO field 25E. The server's MAC address is set in a MAC address field 25F. The node ID is a logical address uniquely identifying a 1394 device of the host terminal. The global unique identifier (GUID) is a physical address for uniquely addressing the device. The unicast FIFO address is a register address for unicast transmission.

As shown in FIG. 2, the host terminal formulates an IP 1394 payload 203 with an IP 1394 header 231, a PPPo1394 header 232 containing a PPPoE header 242, a GUID field 243 (8 bytes) and a unicast FIFO field 244 (6 bytes), followed by a PPPo1394 payload 233 and preceded by a GASP header 201 and an ABW header 202. Host terminal sets its own global unique identifier and unicast FIFO address in respective fields 243 and 244. Since the established maximum length of a PADI packet is 1,484 bytes, the additional 14 bytes of the GUID and unicast FIFO fields 243 and 244 does not exceed the maximum length. The PPPo1394 payload field 233 is comprised of a tag type field 245, a tag length field 246, a tag value field 247 and a payload field 248.

Figure 5:
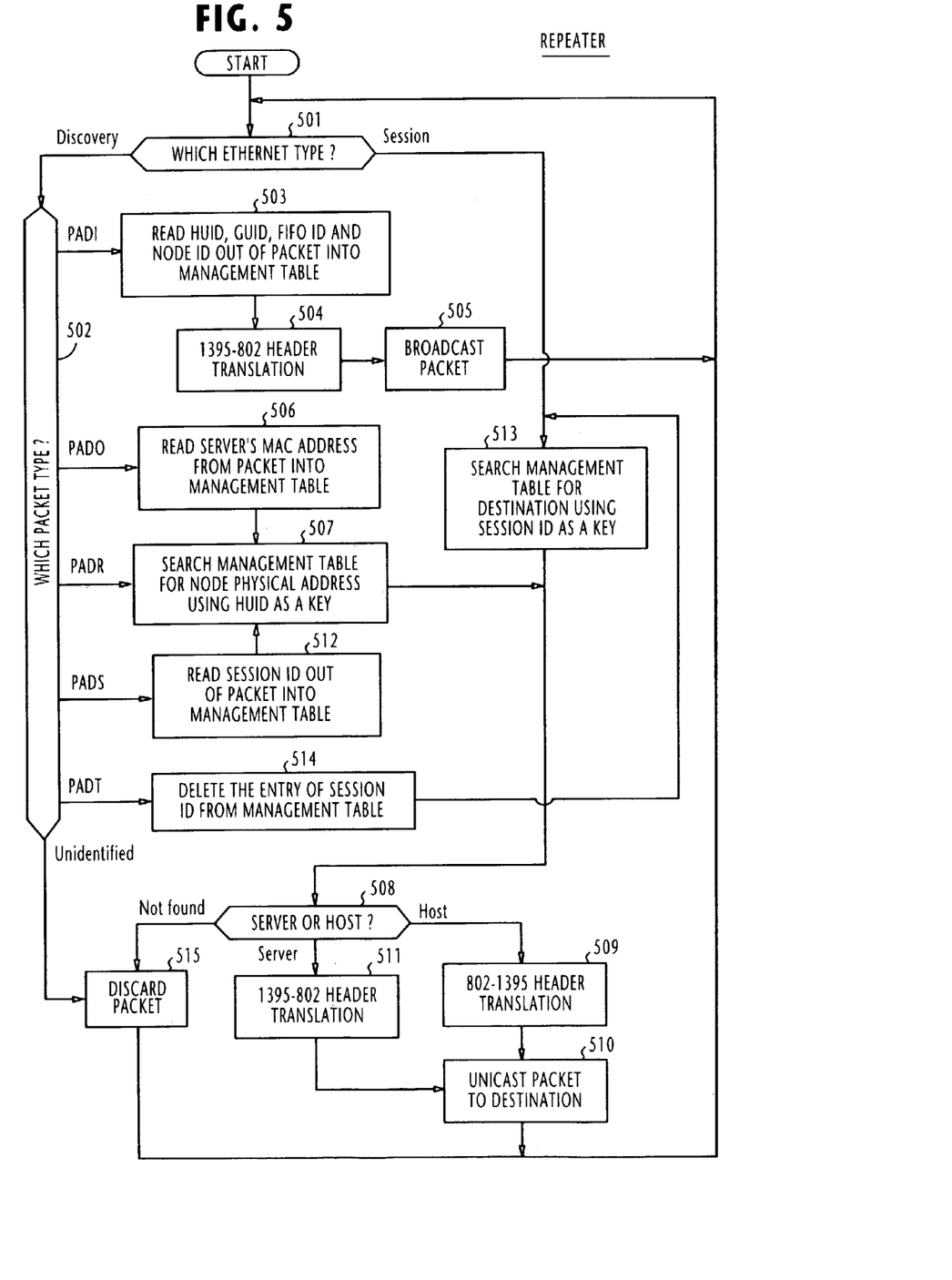
FIG. 5 is a flowchart of the operation of the controller of the packet repeater of FIG. 1.

The following is a description of the operation of the controller 21 of packet repeater 20 of FIG. 1 with the aid of a flowchart shown in FIG. 5 when a packet is received either from a 1394 host terminal or the PPPoE server 40.

When the packet repeater 20 receives a packet of the format of FIG. 2 from the IEEE 1394 terminal 11, for example, the controller 21 reads the Ethernet type field 241 of the IP 1394 header 231 (step 501), and starts a discovery stage.

Controller 21 proceeds to packet-type decision step 502 to read packet type data from the code field 250 of the PPPoE header 242 and recognizes that the packet is a PADI packet. Controller 21 then proceeds from step 502 to step 503 and reads the tag value field 245 (containing host unique ID), the GUID field 243, the unicast FIFO field 244 and the sender node ID field 211 and copies the contents of these fields to corresponding fields of the destination management table 25.

As shown in FIG. 2, the destination management table 25 stores a host unique ID, a session identifier, and node information which is necessary for unicast transmission. The host unique ID and the session identifier are individually used as a search key for making a search through the destination management table 25 for corresponding node identifier, global unique identifier, sender unicast FIFO address and a server's MAC address.

Controller 21 proceeds from step 503 to step 504 to translate the data format of the received PADI packet to a PADI packet of the IEEE-802.x data format (FIG. 4). The IEEE-802.x packet comprises a PPPoE payload field 401 preceded by an 802 header 402 and a PPPoE header 403. The PPPoE payload field 401 includes a tag type field 411, a tag length field 412, a tag value field 413, a tag field 414 and a payload field 415. This PPPoE payload field 401 is used only during the initial discovery stage.

Controller 21 translates the PADI packet of the 1394 format of FIG. 2 to the 802.x format of FIG. 4 and broadcasts the packet to the network (step 505) and returns to step 501. Note that the PADI packet of the 802.x format does not include the global unique identifier and the unicast FIFO address of the requester 1394 host terminal.

When the PPPoE server 40 receives the PADI packet via the ADSL modem 30, it replies with a PADO packet.

When the packet repeater 20 receives this PADO packet, the controller 21 examines the Ethernet type field 421 of the 802.x packet header (see FIG. 4) and recognizes that the current stage is a discovery stage (step 501) and proceeds to step 502 to examine the packet type in the packet type field 431 of the PPPoE header 403 and recognizes that the received packet is a PADO packet. Packet repeater 20 proceeds to step 506 and copies the MAC address of PPPoE server 40 from the target MAC address field 422 of the 802.x header 402 to the MAC address field 25F of destination management table 25.

At step 507, the controller 21 uses the host unique ID set in the tag value field 413 of the PPPoE payload 401 as a key and searches the destination management table 25 for a corresponding host unique ID stored in an entry (row) of the host ID field 25A of the management table 25. If such an entry is detected, the controller 21 proceeds from step 507 to step 508 to read the node information stored in the fields 25C, 25D and 25E of the detected entry of management table 25 and determines whether the packet is to be destined to the requester 1394 host terminal or the PPPoE server 40. If it is determined that the destination of the packet is the 1394 host terminal, the controller proceeds from step 508 to step 509 to translate the PADO packet of the 802.x format (FIG. 4) to the 1394 data format (FIG. 2) by copying the node information from the fields 25C, 25D, 25E to the target node ID field 221 and the offset address field 222 of ABW header 202 Controller 21 unicasts the PADO packet of the 1394 data format to the 1394 host terminal (step 510), and returns to step 501.

In response to the PADO packet from the packet repeater 20, the 1394 host terminal replies with a PADR packet.

On receiving the PADR packet, the controller 21 of the packet repeater 20 proceeds through steps 501 and 502 to step 507 to compare the host unique ID contained in the received packet with those stored in the host ID field 25A of destination management table 25 for a corresponding host unique ID. If they match in one of the entries (rows) of the table 25, the controller 21 examines the MAC address of the PPPoE server contained in the matched entry. If the MAC address of the PPPoE server is detected, the controller 21 converts the PADR packet of the 1394 format to the 802.x format (step 509) and unicasts it to the PPPoE server 40 (step 510).

The server 40 responds to the PADR packet from the packet repeater 20 with a PADS reply packet.

On receiving the PADS packet from the PPPoE server, the controller 21 recognizes that it has received a PADS packet and proceeds from step 502 to step 512. Since this packet contains a session identifier in the session ID field 432 (see FIG. 4), the controller 21 extracts this session identifier and sets it in the session ID field 25B of destination management table 25 (step 512).

Controller 21 proceeds from step 512 to step 507 to make a search through the destination management table 25 for a corresponding host unique ID stored in an entry (row) of the host ID field 25A of the management table 25. If such an entry is detected, the controller 21 proceeds from step 507 to step 508 to read the node information stored in the fields, 25D and 25E of the detected entry and determines whether the packet is to be destined to the requester 1394 host terminal or the PPPoE server 40. If it is determined that the destination of the packet is the 1394 host terminal, the controller proceeds from step 508 to step 509 to translate the PADS packet of the 802.x format to the 1394 data format by copying the node information from the fields 25C, 25D, 25E into the target node ID field 221 and the offset address field 222 of the ABW header 202. Controller 21 unicasts the PADS packet of the 1394 data format to the 1394 host terminal (step 510), and returns to step 501.

The discovery stage now terminates and the packet repeater now enters a session stage. The packets which will be used during the session stage contain no host unique ID. When the packet repeater receives a packet during the session stage, the controller 21 proceeds from step 501 to step 513 to extract the session identifier from the session ID field 251 (FIG. 2) of the packet if the packet has been received from the 1394 host terminal or extract it from the session ID field 432 (FIG. 4) if the packet has been received from the server 40. Controller 21 uses the extracted session identifier as a key to search the destination management table 25 for corresponding node physical address and proceeds to step 508 to determine if the packet is destined to the 1394 host terminal or to the PPPoE server 40, based on the extracted node physical address. The 1394 host terminal is assigned an IP address at the start of the session stage.

During the session stage, the controller 21 executes steps 401, 413, 408, 409 and 410 for packet transmission from the host terminal to the PPPoE server and executes steps 401, 413, 408, 411 and 410 for packet transmission from the PPPoE server to the host terminal. If no destination is detected for a received packet (step 508), the controller 21 proceeds to step 515 to discard the packet.

When the 1394 host or the PPPoE server transmits a PADT request packet in order to terminate the session, the controller 21 proceeds to step 514 to read a session identifier contained in the packet and delete all data stored in an entry of the management table 25 corresponding to that session identifier and then proceeds to step 513 to search the management table 25 for a destination site using the session identifier. If the PADT request packet has been received from the host terminal, steps 508, 509, 510 will be executed to retransmit the PADT request packet to the PPPoE server 40. Otherwise, steps 508, 511, 510 will be executed to retransmit the packet to the 1394 host terminal.

When the destination site receives the PADT request packet from the packet repeater 20, it responds with a PADT reply packet. As a result, when the packet repeater 20 receives the PADT reply packet, it reads the session identifier from the session ID field 431 of the packet (FIG. 4) and delete all data stored in an entry of destination management table 25 corresponding to this session identifier (step 514) and proceeds to step 513 to search the management table 25 for a destination site using that session identifier. If the PADT reply packet has been transmitted from the PPPoE server 40, steps 508, 511, 510 will be executed to retransmit the packet to the 1394 host terminal. Otherwise, steps 508, 509, 510 will be executed to retransmit the packet to the PPPoE server.

Figure 6:
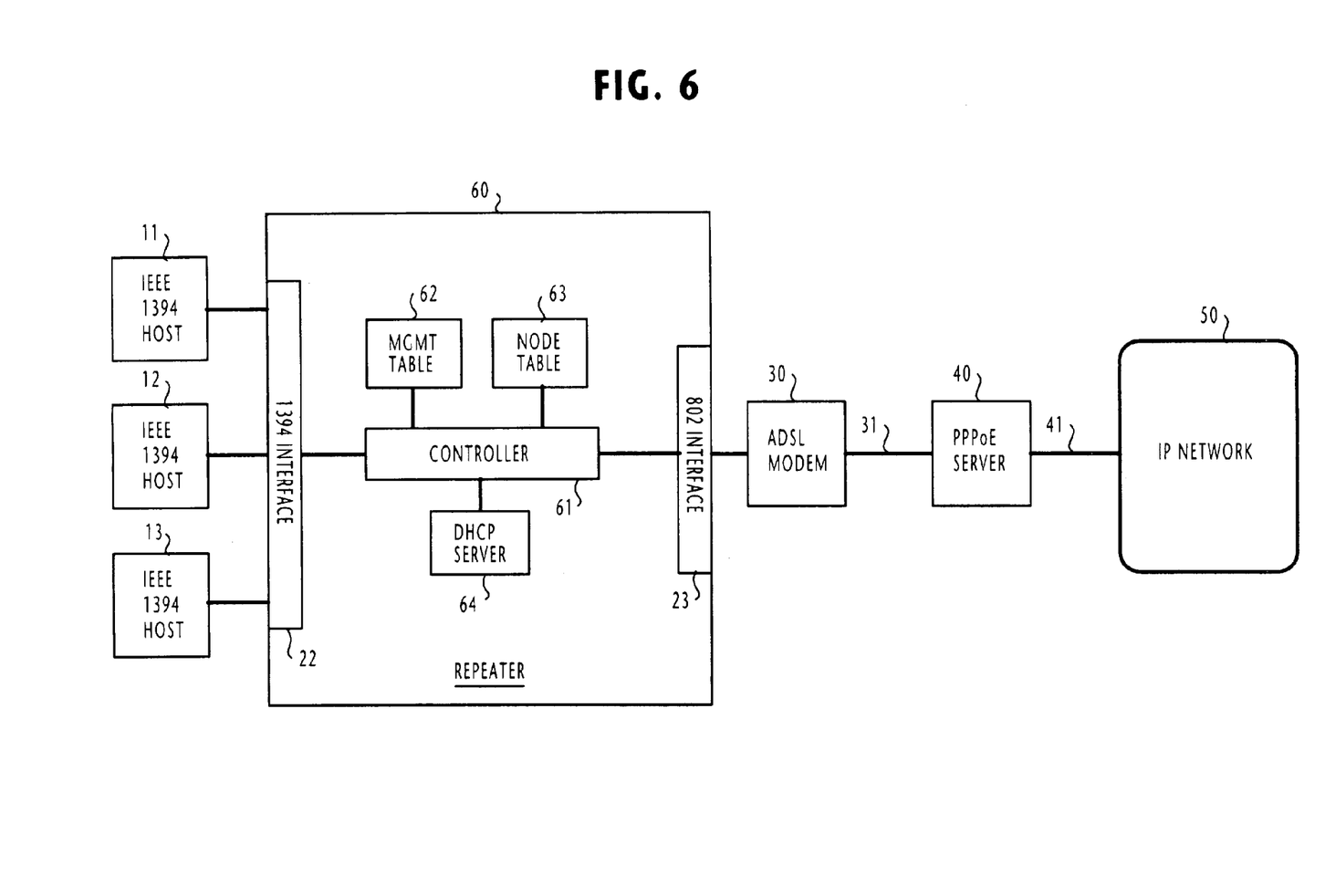
FIG. 6 is a block diagram of a communications system according to a second embodiment of the present invention.

A communications system of a second embodiment of the present invention is shown in FIG. 6, in which parts corresponding in significance to those in FIG. 1 are marked with the same numerals and the description thereof is omitted. Similar to the previous embodiment, the host terminals 11, 12, 13 are logically connected to a packet repeater 60 through dial-up connections.

In FIG. 6, the packet repeater 60 is comprised of a destination management table 62 and a node table 63, both of which are connected to a controller 61.

Figure 7:
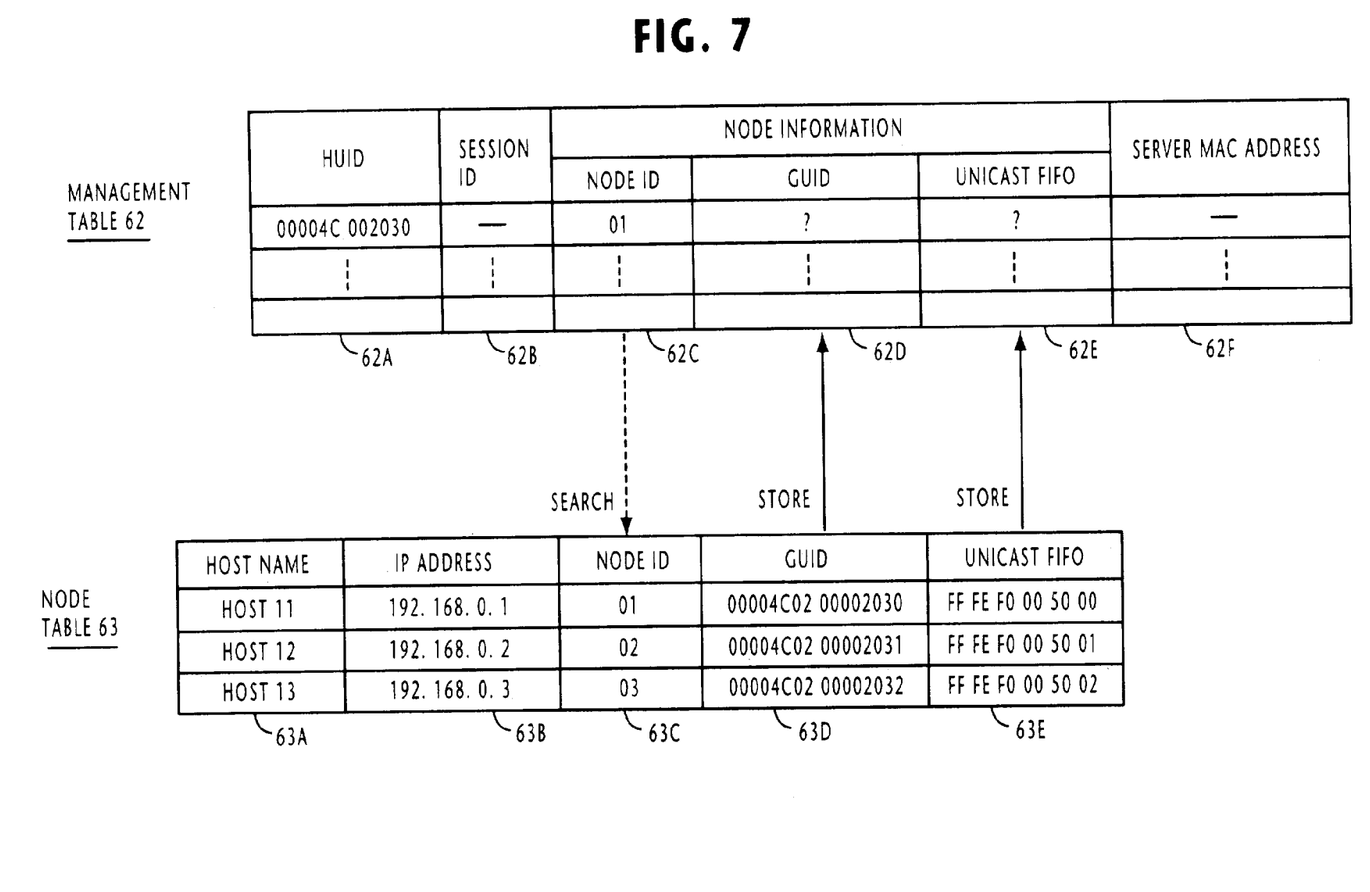
FIG. 7 is an illustration of details of a destination management table and a node table of FIG. 6.

As shown in FIG. 7, the destination management table 62 is identical in configuration to the destination management table 25 of FIG. 1. Physical address table 63 has a plurality of host entries (rows) each being subdivided into a host name field 63A, a 1394-node ID field 63B, a GUID field 63C and a unicast FIFO address field 63D. Node table 63 is used to map the name of the host terminal to its own node identifier (i.e., logical address of a device of the host terminal), a global unique identifier and unicast FIFO address (which in combination represent a physical address of the device). Node ID field 63C and corresponding GUID field 63D of each entry are updated whenever the configuration of the host terminal is modified by an event known as "Bus Reset" which is triggered by the attachment of a new device (i.e., 1394 node) to or the removal of an existing node from the 1394 serial bus of the host terminal.

Figure 8:
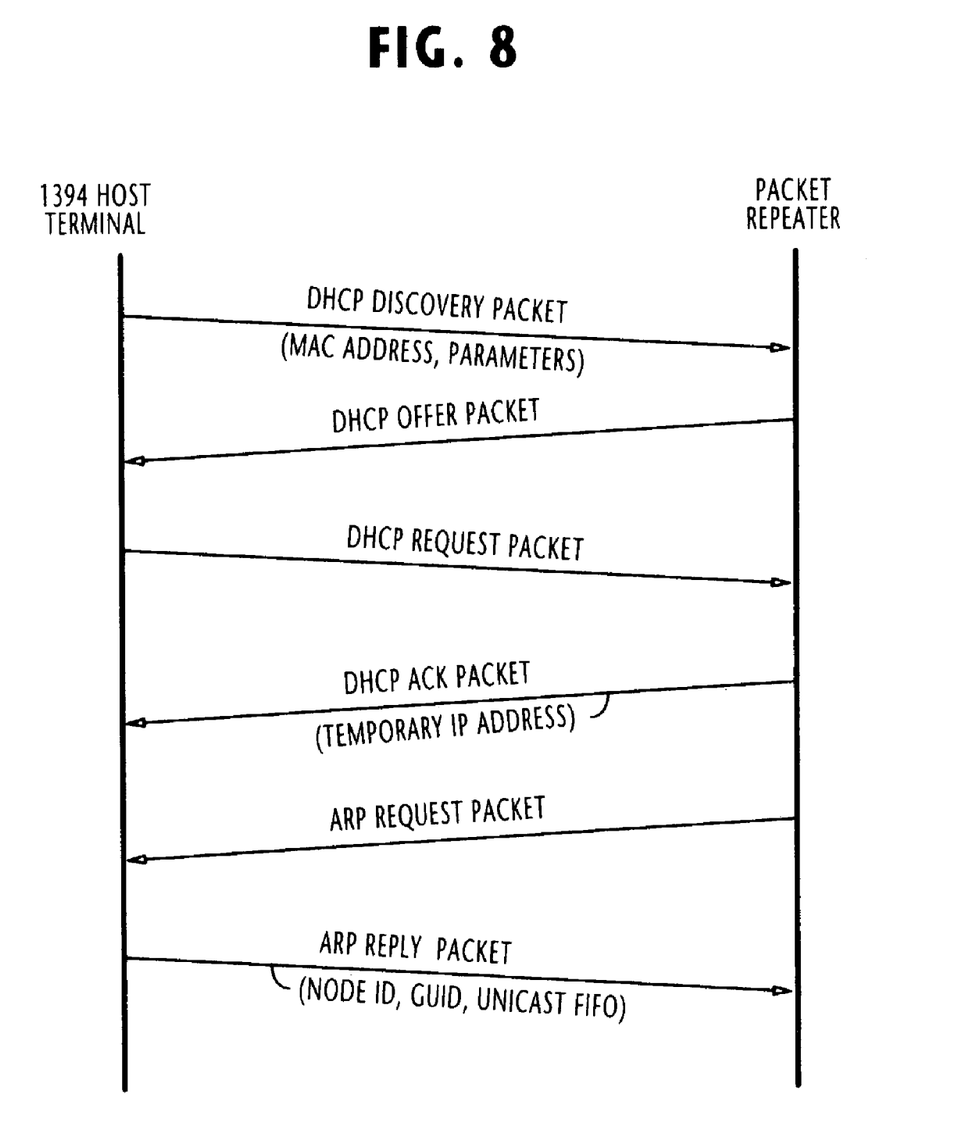
FIG. 8 is a sequence diagram for illustrating DHCP and ARP processes performed before a PPP connection is established.
Figure 9:
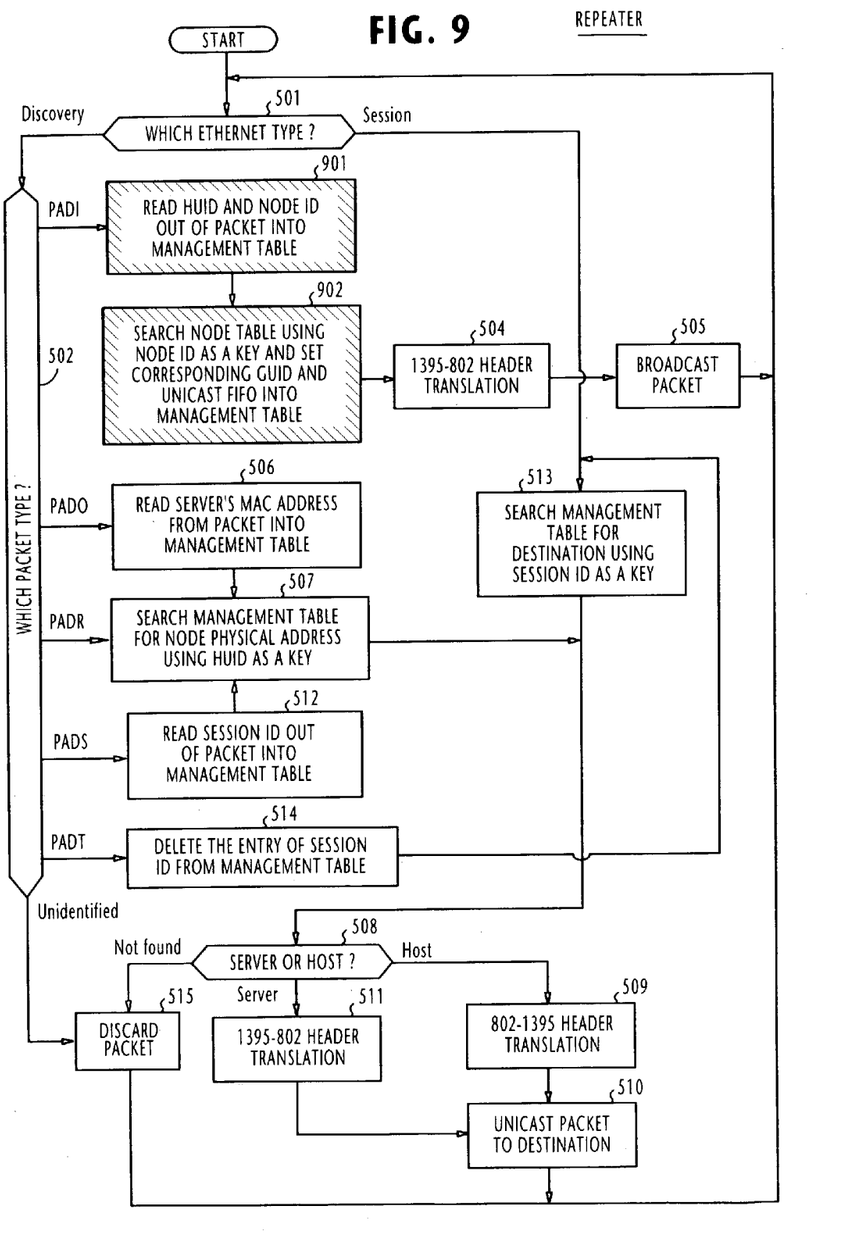
FIG. 9 is a flowchart of the operation of the controller of the packet repeater of FIG. 6.

The operation of controller 61 for establishing a PPP connection will be understood by the description of a flowchart shown in FIG. 9. However, before the operation of FIG. 9 begins, the controller 61 performs DHCP and ARP procedures as illustrated in FIG. 8.

If the host terminals 11, 12, 13 are started in sequence, each host terminal broadcasts a DHCP discovery packet to the packet repeater 60, containing the host's MAC address and parameters the host wishes to obtain from the IP network. A DHCP server 64 is provided in the packet repeater to receive this discovery packet and sends a DHCP Offer packet to the requesting terminal. The host terminal responds with a DHCP request packet which is destined to the server from which the DHCP Offer packet has been transmitted. DHCP server 64 assigns an IP address as a temporary address to the requesting host terminal and sends a DHCP acknowledgment packet destined to the IP address. Controller 61 sets the assigned IP address in the node table 63. Following the transmission of the DHCP acknowledgment packet, the controller 61 transmits an ARP request packet destined to the IP address the DHCP server 64 has just assigned. Therefore, the host terminal responds to the ARP request packet with an ARP reply packet containing its own node identifier, global unique identifier and unicast FIFO identifier. Controller 61 receives the ARP request packet and maps the node identifier, global unique identifier and unicast FIFO ID contained in the ARP reply packet to the corresponding IP address in the node table 63.

Therefore, when DHCP/ARP procedures have been performed on all of the IEEE 1394 host terminals 11, 12, 13, their node tables 63 are set with data necessary for their PPP connections as shown in FIG. 7.

Alternatively, the 1394 host terminals may broadcast a DHCP discovery packet via the packet repeater 60 in order to receive a DHCP offer packet from some DHCP server external to the packet repeater 60. Packet repeater 60 acts as a monitor for monitoring all DHCP acknowledgement packets transmitted to the host terminals 11, 12, 13 and store their assigned addresses in the node table 63 as temporary IP addresses. In this case, Following the DHCP and ARP procedures, the controller 61 is ready to operate according to the flowchart of FIG. 9. Note that in FIG. 9 parts corresponding in significance to those in the flowchart of FIG. 6 are marked with the same numerals and the description thereof is omitted.

When the host terminal 11, for example, sends a PADI packet to the packet repeater 60 in order to establish a PPP connection to the IP network 50, the controller 61 first recognizes that a discovery stage has started for the terminal 11 (step 501) and then proceeds to step 901, recognizing that it has received a PADI packet (step 502). At step 901, the controller 61 copies the host unique ID and the 1394 node identifier of the requesting terminal from the PADI packet to the destination management table 62. Controller 61 proceeds to step 902 to make a search through the node table 63 with the node identifier as a key for corresponding global unique identifier and unicast FIFO ID (as indicated by a dotted-line in FIG. 7) and copies the detected global unique identifier and unicast FIFO address to the destination management table 62 (as indicated by solid-lines in FIG. 7).

Controller 61 now proceeds from step 902 to step 504 to translate the packet to the 802.x format and broadcasts it to the network (step 505) and returns to step 501. Thereafter, the controller 61 operates in the same way as in the previous embodiment, so when the session stage is entered the host terminal is assigned a formal IP address which replaces the temporarily assigned IP address.

What is claimed is:

1. A packet repeater adapted for connection between an IEEE 1394 terminal and a PPP (point-to-point protocol) server, comprising:
    a destination management table having an entry corresponding to said IEEE 1394 terminal; and
    a controller operable during a discovery stage of a PPP connection for receiving a PPP packet from said IEEE 1394 terminal, copying a physical address of a device of said IEEE 1394 terminal contained in the packet to said entry of the destination management table, and successively receiving PPP packets from said server and copying a physical address of the server and a session identifier respectively contained in the packets to said entry of said table,
    said controller, operable during a session stage of said PPP connection, receiving a PPP packet either from said IEEE 1394 terminal or said server and determining the destination of the packet according to the physical address of one of said IEEE 1394 terminal and said server which is set in said destination management table corresponding to a session identifier of the packet.

2. A packet repeater adapted for connection between an IEEE 1394 terminal and a PPP (point-to-point protocol) server, comprising:
    a node table having an entry corresponding to said IEEE 1394 terminal;
    a destination management table having an entry corresponding to said IEEE 1394 terminal; and
    a controller for detecting an IP address assigned to said IEEE 1394 terminal in a DHCP process, sending an ARP request packet destined to said IP address, receiving an ARP reply packet from the IEEE 1394 terminal containing logical and physical addresses of a device of the IEEE 1394 terminal, and copying the logical and physical addresses of the ARP reply packet to said entry of said node table,
    said controller, operable during a discovery stage of a PPP connection, for receiving a PPP packet from said IEEE 1394 terminal, copying the logical and physical addresses of the node table corresponding to a logical address of the packet to said entry of said destination management table, successively receiving PPP packets from said server, copying a physical address of the server and a session identifier respectively contained in the packets to said entry of said destination management table,
    said controller, operable during a session stage of said PPP connection, for receiving a PPP packet either from said IEEE 1394 terminal or said server and determining the destination of the packet according to the physical address of one of said IEEE 1394 terminal and said server which is set in said destination management table corresponding to a session identifier of the packet.

3. The packet repeater of claim 2, further comprising a DHCP server for performing said DHCP process in response to a DHCP discovery packet from said IEEE 1394 terminal and assigning said IP address to said IEEE 1394 terminal when a DHCP request packet is received from said IEEE 1394 terminal.

4. The packet repeater of claim 1 or 2, wherein said physical address of the device comprises a global unique identifier and a register address, and the physical address of the server is a MAC address.

5. The packet repeater of claim 1 or 2, wherein said PPP server is a PPPoE (point-to-point protocol over Ethernet) server.

6. A method of establishing a PPP connection between an IEEE 1394 terminal and a PPP server by using a destination management table having an entry corresponding to said IEEE 1394 terminal, comprising the steps of:
   a) during a discovery stage of a PPP connection, (a1) receiving a PPP packet from said IEEE 1394 terminal and copying a physical address of a device of said IEEE 1394 terminal contained in the packet to said entry of the destination management table, and (a2) successively receiving PPP packets from said server and copying a physical address of the server and a session identifier respectively contained in the packets to said entry of the destination management table; and
   b) during a session stage of said PPP connection, receiving a PPP packet either from said IEEE 1394 terminal or said server and determining the destination of the packet according to the physical address of one of said IEEE 1394 terminal and said server which is set in said destination management table corresponding to a session identifier of the packet.

7. A method of establishing a PPP connection between an IEEE 1394 terminal and a PPP (point-to-point protocol) server by using a node table having an entry corresponding to said IEEE 1394 terminal and a destination management table having an entry corresponding to said IEEE 1394 terminal, comprising the steps of:
   a) detecting an IP address assigned to said IEEE 1394 terminal in a DHCP process;
   b) sending an ARP request packet destined to said IP address;
   c) receiving an ARP reply packet from the IEEE 1394 terminal and copying logical and physical addresses of a device of the IEEE 1394 terminal contained in the ARP reply packet to said entry of said node table,
   d) during a discovery stage of a PPP connection, (d1) receiving a PPP packet from said IEEE 1394 terminal and copying the logical and physical addresses of the node table corresponding to a logical address of the packet to said entry of said destination management table, and (d2) receiving PPP packets in succession from said server and copying a physical address of the server and a session identifier respectively contained in the packets to said entry of the destination management table; and
   e) during a session stage of said PPP connection, receiving a PPP packet either from said IEEE 1394 terminal or said server and determining a destination site of the packet according to the physical address of one of said IEEE 1394 terminal and said server which is set in said destination management table corresponding to a session identifier of the packet.

8. The method of claim 7, further comprising the steps of:
   performing said DHCP process in response to a DHCP discovery packet from said IEEE 1394 terminal; and
   assigning said IP address to said IEEE 1394 terminal when a DHCP request packet is received from said IEEE 1394 terminal.

9. The method of claim 6 or 7, wherein said physical address of the device comprises a global unique identifier and a register address, and the physical address of the server is a MAC address.

10. The method of claim 6 or 7, wherein said PPP server is a PPPoE (point-to-point protocol over Ethernet) server.

11. A communications network comprising:
    an IEEE 1394 terminal;
    a PPP (point-to-point protocol) server; and
    a packet repeater connected between said IEEE 1394 terminal and said PPP server, the packet repeater comprising:
    a destination management table having an entry corresponding to said IEEE 1394 terminal; and
    a controller, operable during a discovery stage of a PPP connection, for receiving a PPP packet from said IEEE 1394 terminal, copying a physical address of a device of said IEEE 1394 terminal contained in the packet to said entry of the destination management table, and successively receiving PPP packets from said server and copying a physical address of the server and a session identifier respectively contained in the packets to said entry of the destination management table,
    said controller, operable during a session stage of said PPP connection, receiving a PPP packet either from said IEEE 1394 terminal or said server for determining the destination of the packet according to the physical address of one of said IEEE 1394 terminal and said server which is set in said destination management table corresponding to a session identifier of the packet.

12. A communications network comprising:
    an IEEE 1394 terminal;
    a PPP (point-to-point protocol) server; and
    a packet repeater connected between said IEEE 1394 terminal and said server, the packet repeater comprising:
    a node table having an entry corresponding to said IEEE 1394 terminal;
    a destination management table having an entry corresponding to said IEEE 1394 terminal; and
    a controller for detecting an IP address assigned by a DHCP process to said IEEE 1394 terminal, sending an ARP request packet destined to said IP address, receiving an ARP reply packet from the IEEE 1394 terminal containing logical and physical addresses of a device of the IEEE 1394 terminal, and copying the logical and physical addresses of the ARP reply packet to said entry of said node table,
    said controller, operable during a discovery stage of a PPP connection, for receiving a PPP packet from said IEEE 1394 terminal, copying the logical and physical addresses of the node table corresponding to a logical address of the packet to said entry of said destination management table, successively receiving PPP packets from said server and copying a physical address of the server and a session identifier respectively contained in the packets to said entry of said destination management table,
    said controller, operable during a session stage of said PPP connection, receiving a PPP packet either from said IEEE 1394 terminal or said server and determining the destination of the packet according to the physical address of one of said IEEE 1394 terminal and said server which is set in said destination management table corresponding to a session identifier of the packet.

13. The communications network of claim 12, wherein said packet repeater further comprises a DHCP server for performing said DHCP process in response to a DHCP discovery packet from said IEEE 1394 terminal and assigning said IP address to said IEEE 1394 terminal when a DHCP request packet is received from said IEEE 1394 terminal.

14. The communications network of claim 11 or 12, wherein said physical address of the device comprises a global unique identifier and a register address, and the physical address of the server is a MAC address.

15. The communications network of claim 11 or 12, wherein said PPP server is a PPPoE (point-to-point protocol over Ethernet) server.

16. A computer-readable storage medium containing a program for establishing a PPP connection between an IEEE 1394 terminal and a PPP server by using a destination management table having an entry corresponding to said IEEE 1394 terminal, said program comprising the steps of:
   a) during a discovery stage of a PPP connection, (a1) receiving a PPP packet from said IEEE 1394 terminal and copying a physical address of a device of said IEEE 1394 terminal contained in the packet to said entry of the destination management table, and (a2) successively receiving PPP packets from said server and copying a physical address of the server and a session identifier respectively contained in the packets to said entry of the destination management table; and
   b) during a session stage of said PPP connection, receiving a PPP packet either from said IEEE 1394 terminal or said server and determining the destination of the packet according to the physical address of one of said IEEE 1394 terminal and said server which is set in said destination management table corresponding to a session identifier of the packet.

17. A computer-readable storage medium containing a program for establishing a PPP connection between an IEEE 1394 terminal and a PPP (point-to-point protocol) server by using a node table having an entry corresponding to said IEEE 1394 terminal and a destination management table having an entry corresponding to said IEEE 1394 terminal, said program comprising the steps of:
   a) detecting an IP address assigned to said IEEE 1394 terminal in a DHCP process;
   b) sending an ARP request packet destined to said IP address;
   c) receiving an ARP reply packet from the IEEE 1394 terminal and copying logical and physical addresses of a device of the IEEE 1394 terminal contained in the ARP reply packet to said entry of said node table,
   d) during a discovery stage of a PPP connection, (d1) receiving a PPP packet from said IEEE 1394 terminal and copying the logical and physical addresses of the node table corresponding to a logical address of the packet to said entry of said destination management table, and (d2) receiving PPP packets in succession from said server and copying a physical address of the server and a session identifier respectively contained in the packets to said entry of the destination management table; and
   e) during a session stage of said PPP connection, receiving a PPP packet either from said IEEE 1394 terminal or said server and determining a destination site of the packet according to the physical address of one of said IEEE 1394 terminal and said server which is set in said destination management table corresponding to a session identifier of the packet.

18. The computer-readable storage medium of claim 17, further comprising the steps of:
   performing said DHCP process in response to a DHCP discovery packet from said IEEE 1394 terminal; and
   assigning said IP address to said IEEE 1394 terminal when a DHCP request packet is received from said IEEE 1394 terminal.

19. The computer-readable storage medium of claim 16 or 17, wherein said physical address of the device comprises a global unique identifier and a register address, and the physical address of the server is a MAC address.

20. The computer-readable storage medium of claim 16 or 17, wherein said PPP server is a PPPoE (point-to-point protocol over Ethernet) server.

* * * * *